United States Patent
Lee et al.

(10) Patent No.: US 9,877,181 B2
(45) Date of Patent: Jan. 23, 2018

(54) DEVICE DISCOVERY METHOD AND COMMUNICATION DEVICE THEREOF

(71) Applicant: LG ELECTRONICS INC., Seoul (KR)

(72) Inventors: Byungjoo Lee, Seoul (KR); Jinwoo Kim, Seoul (KR); Jaehyung Song, Seoul (KR); Inhwan Choi, Seoul (KR); Hangseok Oh, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/153,312

(22) Filed: May 12, 2016

(65) Prior Publication Data
US 2016/0345155 A1 Nov. 24, 2016

Related U.S. Application Data

(63) Continuation of application No. 13/882,935, filed as application No. PCT/KR2011/008254 on Nov. 1, 2011, now Pat. No. 9,369,947.

(60) Provisional application No. 61/425,267, filed on Dec. 21, 2010, provisional application No. 61/417,286,
(Continued)

(51) Int. Cl.
| | |
|---|---|
| *G06F 15/16* | (2006.01) |
| *H04W 8/00* | (2009.01) |
| *H04W 48/16* | (2009.01) |
| *H04W 8/18* | (2009.01) |
| *H04L 29/08* | (2006.01) |

(Continued)

(52) U.S. Cl.
CPC ......... *H04W 8/005* (2013.01); *H04L 67/1046* (2013.01); *H04W 4/008* (2013.01); *H04W 8/186* (2013.01); *H04W 48/16* (2013.01); *H04W 84/10* (2013.01)

(58) Field of Classification Search
CPC ..... H04W 48/16; H04W 84/10; H04W 8/005; H04W 8/186; H04W 4/008; H04L 67/1046
USPC .................................................. 709/203–238
See application file for complete search history.

(56) References Cited

U.S. PATENT DOCUMENTS

| | | | |
|---|---|---|---|
| 8,099,675 B2 | 1/2012 | Takamune | 715/772 |
| 8,112,794 B2 | 2/2012 | Little et al. | 726/9 |
| 2002/0110123 A1 | 8/2002 | Shitama | 370/389 |

(Continued)

FOREIGN PATENT DOCUMENTS

| | | | | |
|---|---|---|---|---|
| JP | 2007166412 A | 6/2007 | | |
| WO | WO 2005109754 A1 | 11/2005 | ........... | H04L 41/142 |

OTHER PUBLICATIONS

James et al., IMP: ISP-Managed P2P, 978-1-4244-7141-6/10/$26.00 © 2010 IEEE.*

(Continued)

*Primary Examiner* — Moustafa M Meky
*Assistant Examiner* — Thorne E Waugh
(74) *Attorney, Agent, or Firm* — Dentons US LLP

(57) ABSTRACT

Provided are a device discovery method and a communication device thereof. The method includes: transmitting a probe request frame; receiving a probe response frame including session information on a client connected to a group owner (GO), from the GO among source and sink devices belonging to the display group; and determining
(Continued)

whether to associate with the display group by using the session information in the probe response frame.

10 Claims, 20 Drawing Sheets

Related U.S. Application Data filed on Nov. 26, 2010, provisional application No. 61/409,915, filed on Nov. 3, 2010.

(51) Int. Cl.
*H04W 4/00* (2009.01)
*H04W 84/10* (2009.01)

(56) References Cited

U.S. PATENT DOCUMENTS

| | | | |
|---|---|---|---|
| 2008/0242220 A1 | 10/2008 | Wilson et al. | 455/3.04 |
| 2009/0129283 A1 | 5/2009 | Kwon et al. | |
| 2010/0198952 A1 | 8/2010 | Kneckt et al. | |
| 2011/0053521 A1 | 3/2011 | Cordeiro | 455/73 |
| 2011/0082939 A1* | 4/2011 | Montemurro | H04W 76/023 709/227 |
| 2011/0103264 A1 | 5/2011 | Wentink | 370/255 |
| 2011/0122835 A1* | 5/2011 | Naito | H04W 76/023 370/329 |
| 2012/0243524 A1* | 9/2012 | Verma | H04W 48/16 370/338 |

OTHER PUBLICATIONS

Ma et al., A Sensor Web Service Framework to Enable Realtime Information Sharing, Washington State University Vancouver, School of Engineering and Computer Science, Aug. 2009.

* cited by examiner

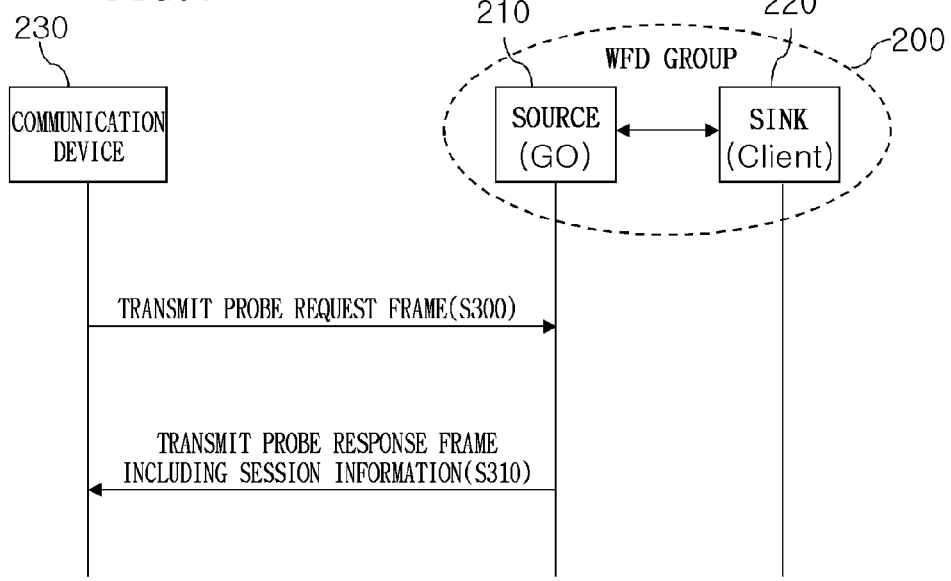
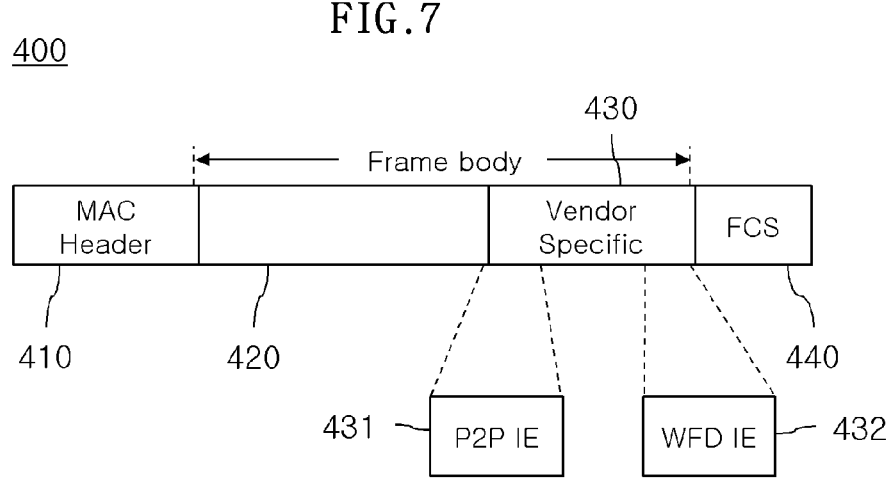

FIG.8

| Order | Information | Notes |
|---|---|---|
| 1 | SSID | |
| 2 | Supported rates | |
| 3 | Request information | May be included if dot11MultiDomainCapabilityEnabled is true. |
| 4 | Extended Supported Rates | The Extended Supported Rates element is present whenever there are more than eight supported rates, and it is optional otherwise. |

FIG.9

| Attributes | Attribute ID | Notes |
|---|---|---|
| P2P Capability | 2 | The P2P Capability attribute shall be present in the P2P IE. |
| P2P Device ID | 3 | The P2P Device ID attribute may be present in the Probe Request frame when using the discovery protocol to find a P2P Device with a specific Device Address. |
| Listen Channel | 6 | The Listen Channel attribute shall be present in the P2P IE indicating the operating class and channel number on which the P2P Device is in the Listen State. If the P2P Device has not selected a Listen Channel, the Listen Channel attribute shall be omitted. |
| Extended Listen Timing | 8 | The Extended Listen Timing attribute may be present in the P2P IE to advertise Listen State availability of the P2P Device sending the Probe Request. |
| Operating Channel | 17 | The Operating Channel attribute shall only be present in the P2P IE if the P2P Device is an operating P2P Group Owner and indicates the operating class and channel number on which the P2P Device is operating as P2P Group Owner. |

| Field | Size (octets) | Value (Hexadecimal) | Description |
|---|---|---|---|
| Element ID | 1 | DD | IEEE 802.11 vendor specific usage |
| Length | 1 | Variable | Length of the following fields in the IE in octets. The length field is variable and set to 4 plus the total length of WFD attributes. |
| OUI | 3 | 50 6F 9A | WFA Specific OUI |
| OUI Type | 1 | 0x0X | Identifying the type or version of the WFD IE. Setting to 0x0A indicates WFA WFD v1.0 |
| WFD Attributes | Variable | | One or more WFD subelements appear in the WFD IE |

(b)

| Attribute ID | Notes | Attribute ID | Notes |
|---|---|---|---|
| 0 | Status | 14 | WFD Group Info |
| 1 | Minor Reason Code | 15 | WFD Group ID |
| 2 | WFD Device Capability | 16 | WFD Interface |
| 3 | WFD Device ID | 17 | Operating Channel |
| 4 | Group Owner Intent | 18 | Invitation Flags |
| 5 | Configuration Timeout | 19 | WFD Configuration |
| 6 | Listen Channel | 20 | WFD Device Type |
| 7 | WFD Group BSSID | 21 | WFD Redirection |
| 8 | Extended Listen Timing | 22 | Secondary Pairing |
| 9 | Intended WFD Interface Address | 23-220 | Reserved |
| 10 | WFD Manageability | 221 | Vendor specific attribute |
| 11 | Channel List | 222-255 | Reserved |
| 12 | Notice of Absence | | |
| 13 | WFD Device Info | | |

(c)

| Subelements | Subelement ID | Notes |
|---|---|---|
| WFD Device Information | 0 | The WFD Device nformation subelement shall be present in the WFD IE. |
| Associated BSSID | 1 | The Associated BSSID subelement shall be present in the WFD IE in the probe request frame transmitted by a WFD device if the device is associated with an infrastructure AP. |
| Coupled Sink Information | 6 | The Coupled Sink Information subelement shall be present in the WFD IE in the probe request frame transmitted by a WFD sink device that supports coupled sink operation. |

FIG. 11

| Order | Information | Notes |
|---|---|---|
| 1 | Timestamp | |
| 2 | Beacon interval | |
| 3 | Capability | |
| 4 | SSID | |
| 5 | Supported rates | The FH Parameter Set information element is present within Probe Response frames generated by STAs using FH PHYs. |
| 6 | FH Parameter Set | |
| ... | ... | ... |
| 22 | EDCA Parameter Set | The EDCA Parameter Set element is present when dot11QosOptionImplemented is true. |

FIG. 12

| Attributes | Attribute ID | Notes |
|---|---|---|
| P2P Capability | 2 | The P2P Capability attribute shall be present in the P2P IE. |
| Extended Listen Timing | 8 | The Extended Listen Timing attribute may be present in the P2P IE. |
| Notice of Absence | 12 | The Notice of Absence attribute shall only be present in the P2P IE in the Probe Response frames transmitted by a P2P Group Owner when a Notice of Absence schedule is being advertised in the Beacon frames (see §3.3.3.2). |
| P2P Device Info | 13 | The P2P Device Info attribute shall be present in the P2P IE to indicate the P2P Device information. |
| P2P Group Info | 14 | The P2P Group Info attribute shall only be present in the P2P IE in the Probe Response frame that is transmitted by a P2P Group Owner. |

FIG. 13

| Subelements | Subelement ID | Notes |
|---|---|---|
| WFD Device Information | 0 | The WFD Device Information subelement shall be present in the WFD IE. |
| Associated BSSID | 1 | The Associated BSSID subelement shall be present in the WFD IE in the probe response frame transmitted by a WFD device if the device is associated with an infrastructure AP. |
| Coupled Sink Information | 6 | The Coupled Sink Information subelement shall be present in the WFD IE in the probe response frame transmitted by a WFD sink device that supports coupled sink operation. |
| WFD Session Information | 9 | The WFD Session Information subelement shall be present in the WFD IE in the probe response frame transmitted by a GO of the WFD session |

FIG. 14

| Field | Size (octets) | Value | Description |
|---|---|---|---|
| Subelement ID | 1 | 9 | Identifying the type of WFD subelement |
| Length | 1 | variable | Length of the following fields of the sub-element. |
| WFD Device Info Descriptor | Sum of all WFD device info Descriptor | variable | List of WFD device Info Descriptor |

FIG. 15

| Field | Size (octets) | Value | Description |
|---|---|---|---|
| Length | 1 | Variable | Length of the following fields. |
| Device address | 6 | | Device address |
| WFD Device Information | 2 | | WFD Device Information bitmap |
| Associated BSSID | 6 | | Address of the infrastructure AP to which the WFD Device is associated. |
| Coupled Sink Information | 7 | | Coupling Status and address of the coupled primary/secondary sink to which the WFD devices is coupled or ready to couple. |

FIG. 16

| Bits | Interpretation |
|---|---|
| 0~1 | 0b00: WFD source<br>0b01: WFD primary sink<br>0b10: WFD secondary sink<br>0b11: WFD source/primary sink |
| 2 | 0b0: secondary sink operation not supported<br>0b1: secondary sink operation supported |
| 3~4 | 0b00: Not-paired/Available for pairing<br>0b01: Paired & Idle<br>0b10: Active<br>0b11: Set by WFD source devices; Set by WFD sink devices not supporting secondary sink operation. |
| 5 | 0b0: WFD Service Discovery (WSD): Not supported<br>0b1: WFD Service Discovery (WSD): Supported |
| 6 | 0b0: Preferred Connectivity (PC): P2P<br>0b1: Preferred Connectivity (PC): TDLS |
| 7 | 0b0 : Contents Protection : Not supported<br>0b1 : Contents Protection : Supported |
| 8~15 | Reserved |

FIG. 17

| Field | Size (octets) | Value | Description |
|---|---|---|---|
| Coupled Sink Status | 1 | | Coupled Sink Status bitmap |
| Coupled Sink Address | 6 | | Address of the coupled primary/secondary sink to which the WFD device is coupled. This field is ignored when a device is not coupled as indicated by the Coupled Sink status.. |

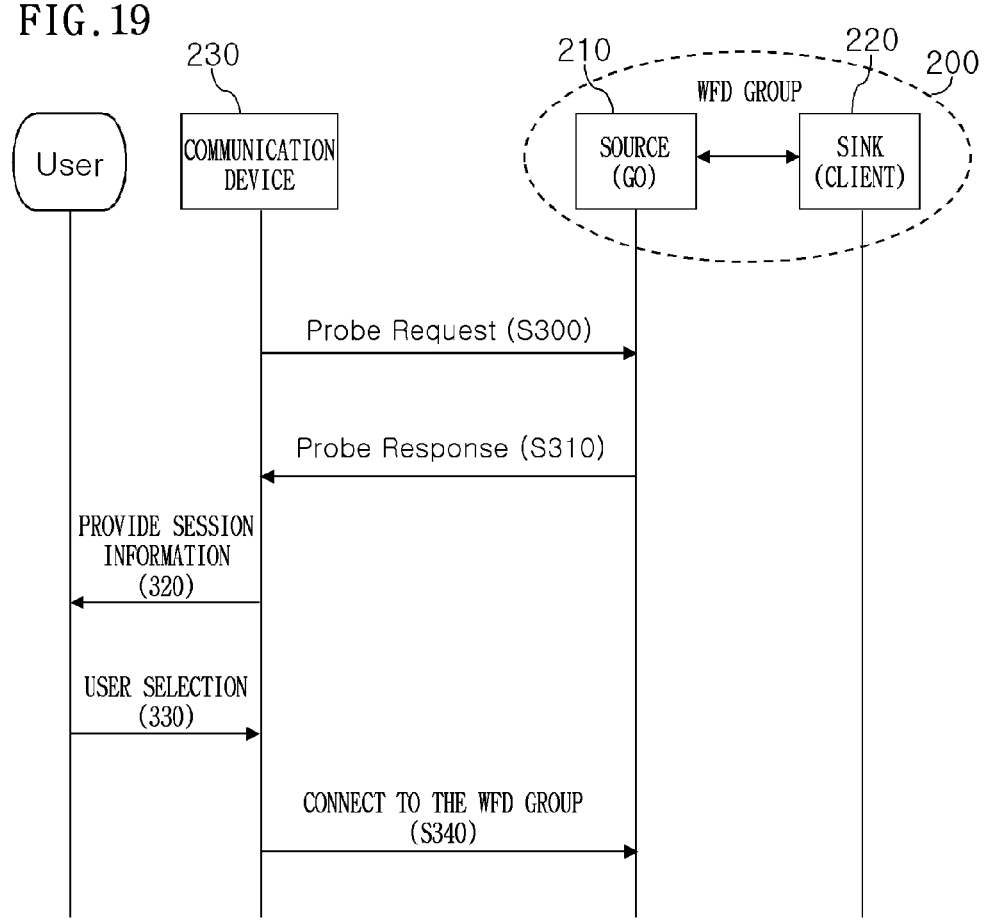

FIG.20
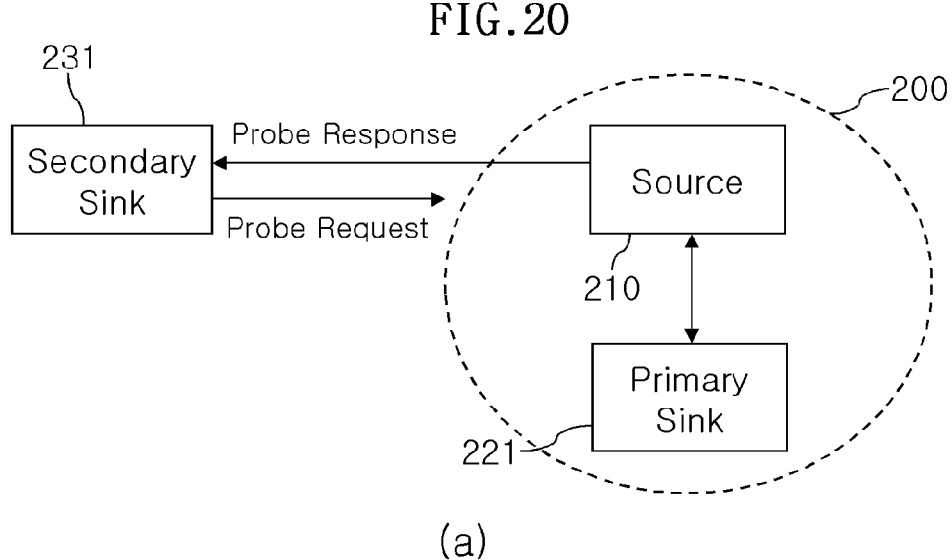
(a)
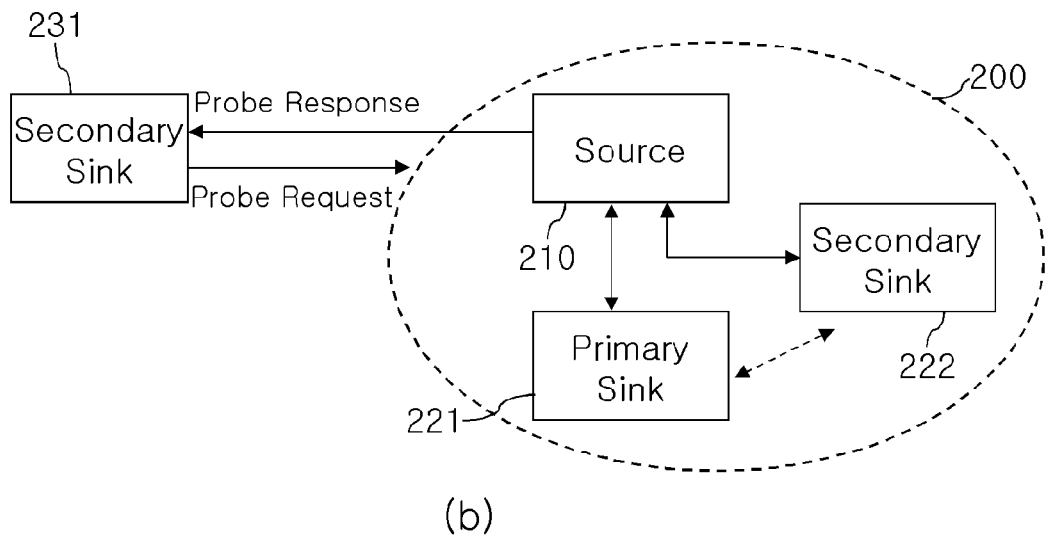
(b)

| | type | category | secondary sink function |
|---|---|---|---|
| 1 | Source | DTV | support |
| 2 | Primary sink | Mobile Phone | support |

Connect   New Group   Cancel (b)

| | type | category | secondary sink function |
|---|---|---|---|
| 1 | Source | DTV | support |
| 2 | Primary sink | Mobile Phone | support |
| 3 | Secondary Sink | Speaker | |

Connect   New Group   Cancel

FIG.22

| Attributes | Attribute ID | Notes |
|---|---|---|
| P2P Capability | 2 | The P2P Capability attribute shall be present in the P2P IE. |
| P2P Device Info | 13 | The P2P Device Info attribute shall be present in the P2P IE. |
| P2P Group ID | 15 | The P2P Group ID attribute shall be present in the P2P IE when joining an operating P2P Group. |

FIG. 24
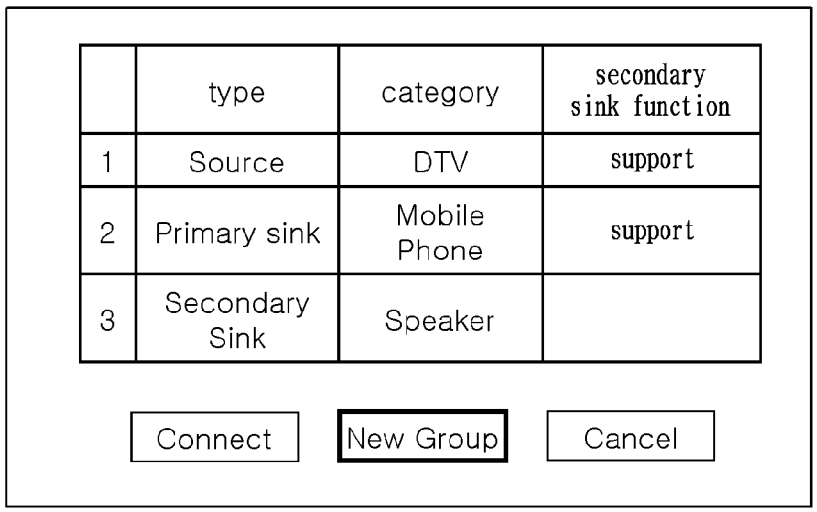
(a)
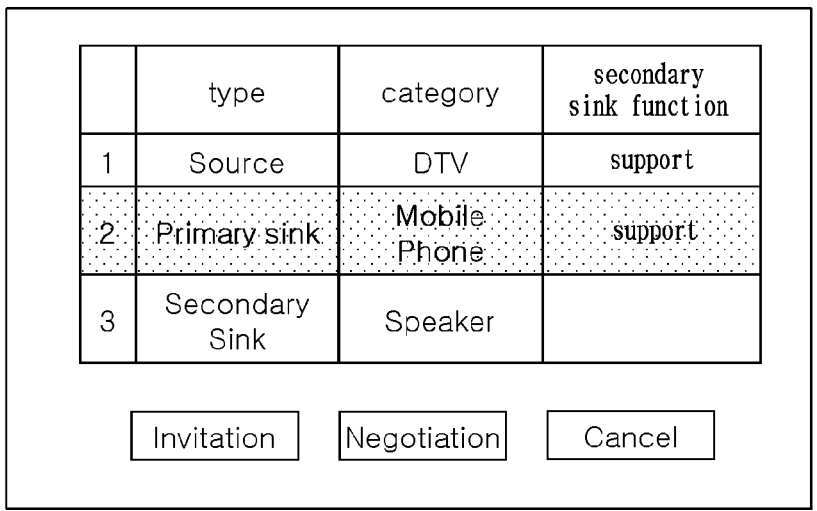
(b)

FIG. 25

| Attributes | Attribute ID | Notes |
|---|---|---|
| P2P Device ID | 3 | The P2P Device ID attribute shall be present in the P2P IE. |
| P2P Group ID | 15 | The P2P Group ID attribute shall be present in the P2P IE. |

FIG. 26

| Attributes | Attribute ID | Notes |
|---|---|---|
| Status | 0 | The Status attribute shall be present in the P2P IE. |

FIG. 27

| Attributes | Attribute ID | Notes |
|---|---|---|
| Configuration Timeout | 5 | The Configuration Timeout attribute shall be present in the P2P IE. |
| Invitation Flags | 18 | The Invitation Flags attribute shall be present in the P2P IE. |
| Operating Channel | 17 | The Operating Channel attribute shall be present in the P2P IE if the P2P Invitation Request frame is transmitted by the P2P Group Owner. The Operating Channel attribute may be present in the P2P IE if the P2P Invitation Request frame is transmitted by a P2P Client. |
| P2P Group BSSID | 7 | The P2P Group BSSID attribute shall be present in the P2P IE if the P2P Invitation Request frame is transmitted by the P2P Group Owner or by a P2P Client if the Invitation Type in the Invitation Flags attribute is 0, indicating a P2P Invitation Request to join an active P2P Group. |
| Channel List | 11 | The Channel List attribute shall be present in the P2P IE. |
| P2P Group ID | 15 | The P2P Group ID attribute shall be present in the P2P IE. |
| P2P Device Info | 13 | The P2P Device Info attribute shall be present in the P2P IE. |

FIG.28

| Attributes | Attribute ID | Notes |
|---|---|---|
| Status | 0 | The Status attribute shall be present in the P2P IE. |
| Configuration Timeout | 5 | The Configuration Timeout attribute shall be present in the P2P IE. |
| Operating Channel | 17 | The Operating Channel attribute shall be present in the P2P IE if the P2P Invitation Request frame is transmitted by the P2P Group Owner and the Status field is set to "Success". The Operating Channel attribute may be present in the P2P IE if the P2P Invitation Request frame is transmitted by a P2P Client. |
| P2P Group BSSID | 7 | The P2P Group BSSID attribute shall be present in the P2P IE if the P2P Invitation Response frame is transmitted by the P2P Group Owner and the Status field is set to "Success". |
| Channel List | 11 | The Channel List attribute shall be present in the P2P IE if the Status field is set to 'Success'. |

FIG. 29

| Attributes | Attribute ID | Notes |
| --- | --- | --- |
| P2P Capability | 2 | The P2P Capability attribute shall be present in the P2P IE. |
| Group Owner Intent | 4 | The Group Owner Intent attribute shall be present in the P2P IE. |
| Configuration Timeout | 5 | The Configuration Timeout attribute shall be present in the P2P IE. |
| Listen Channel | 6 | The Listen Channel attribute shall be present in the P2P IE. |
| Extended Listen Timing | 8 | The Extended Listen Timing attribute may be present in the P2P IE to advertise Listen State availability of the P2P Device sending the GO Negotiation Request. |
| Intended P2P Interface Address | 9 | The Intended P2P Interface Address attribute shall be present in the P2P IE. |
| Channel List | 11 | The Channel List attribute shall be present in the P2P IE. |
| P2P Device Info | 13 | The P2P Device Information attribute shall be present in the P2P IE. |
| Operating Channel | 17 | The Operating Channel attribute shall be present in the P2P IE. |

FIG. 30

| Attributes | Attribute ID | Notes |
|---|---|---|
| Status | 0 | The Status attribute shall be present in the P2P IE. |
| P2P Capability | 2 | The P2P Capability attribute shall be present in the P2P IE. |
| Group Owner Intent | 4 | The Group Owner Intent attribute shall be present in the P2P IE. |
| Configuration Timeout | 5 | The Configuration Timeout attribute shall be present in the P2P IE. |
| Operating Channel | 17 | The Operating Channel attribute may be present in the P2P IE. |
| Intended P2P Interface Address | 9 | The Intended P2P Interface Address attribute shall be present in the P2P IE. |
| Channel List | 11 | The Channel List attribute shall be present in the P2P IE. |
| P2P Device Info | 13 | The P2P Device Information attribute shall be present in the P2P IE. |
| P2P Group ID | 15 | The P2P Group ID attribute shall be present if the P2P Device sending the GO Negotiation Response frame will become P2P Group Owner following Group Owner Negotiation. |

FIG. 31

| Attributes | Attribute ID | Notes |
|---|---|---|
| Status | 0 | The Status attribute shall be present in the P2P IE. |
| P2P Capability | 2 | The P2P Capability attribute shall be present in the P2P IE. |
| Operating Channel | 17 | The Operating Channel attribute shall be present in the P2P IE. |
| Channel List | 11 | The Channel List attribute shall be present in the P2P IE. |
| P2P Group ID | 15 | The P2P Group ID attribute shall be present if the P2P Device sending the GO Negotiation Confirmation frame will become P2P Group Owner following Group Owner Negotiation. |

DEVICE DISCOVERY METHOD AND COMMUNICATION DEVICE THEREOF

CROSS-REFERENCE TO RELATED APPLICATIONS

The present application is a continuation of U.S. application Ser. No. 13/882,935 filed May 1, 2013, which is a National Stage Entry of International Application No. PCT/KR2011/008254 filed Nov. 1, 2011, which claims priority to U.S. Provisional Application No. 61/425,267 filed Dec. 21, 2010, 61/417,286 filed Nov. 26, 2010 and 61/409,915 filed Nov. 3, 2010, all of which are hereby incorporated by reference in its entirety.

BACKGROUND

The present invention disclosure relates to a method of transmitting/receiving multimedia content by connecting a plurality of devices to configure a display group.

A variety of wireless communication technologies have been developed along with the development of information communication technology. Among the wireless communication technologies, WLAN is a technology that allows portable terminals such as a personal digital assistant (PDA), a laptop computer, and a portable multimedia player (PMP) to wirelessly access a high-speed internet in a home or a business or specific service area, on the basis of wireless frequency technology.

For example, communication on the WLAN based on the IEEE 802.11 standard may be provided in a basic service set (BSS) including an access point (AP) and a distribution system. Moreover, recently, as a wireless short-range communication technology is widely applied to a market, a P2P wireless communication method for direct connection between devices without an AP is being developed.

SUMMARY

Embodiments provide a device discovery method for efficiently delivering information on source and sink devices in a display group and a communication device using the same.

In one embodiment, provided is a method of discovering a device in a display group transmitting/receiving multimedia content, the method including: transmitting a probe request frame; receiving a probe response frame including session information on a client connected to a group owner (GO), from the GO among source and sink devices belonging to the display group; and determining whether to associate with the display group by using the session information in the probe response frame.

In another embodiment, provided is a device transmitting/receiving multimedia content in connection with a display group configured with source and sink devices, the device including: a transceiver unit transmitting a probe request frame; receiving a probe response frame including session information on a client connected to a group owner (GO), from the GO among source and sink devices belonging to the display group; and an interface unit associating with the display group by using the session information in the prober response frame.

The details of one or more embodiments are set forth in the accompanying drawings and the description below. Other features will be apparent from the description and drawings, and from the claims.

BRIEF DESCRIPTION OF THE DRAWINGS

FIG. 6 is a view illustrating a device discovery method according to an embodiment of the present invention.

FIG. 7 is a view illustrating a format of a management frame according to an embodiment of the present invention.

FIG. 8 is a view illustrating a configuration of a frame body of a prove request frame according to an embodiment of the present invention.

FIG. 9 is a view illustrating a configuration of a P2P IE element in a probe request frame according to an embodiment of the present invention.

FIG. 10 is a view illustrating a configuration of a WFD IE element in a probe request frame according to an embodiment of the present invention.

FIG. 11 is a view illustrating a configuration of a frame body of a prove response frame according to an embodiment of the present invention.

FIG. 12 is a view illustrating a configuration of a P2P IE element in a probe response frame according to an embodiment of the present invention.

FIG. 13 is a view illustrating a configuration of a WFD IE element in a probe response frame according to an embodiment of the present invention.

FIG. 14 is a view illustrating a configuration of session information in WFD IE element shown in FIG. 13 according to an embodiment of the present invention.

FIG. 15 is a view illustrating a configuration of a device info descriptor in session information according to an embodiment of the present invention.

FIG. 16 is a view illustrating a configuration of a device info bitmap in a device info descriptor according to an embodiment of the present invention.

FIG. 17 is a view illustrating a configuration of coupled sink information in a device info descriptor according to an embodiment of the present invention.

FIG. 18 is a view illustrating a configuration of a coupled sink status field in coupled sink information according to an embodiment of the present invention.

FIG. 19 is a view illustrating a method of associating with a WFD group according to an embodiment of the present invention.

FIG. 20 is a view illustrating a method of determining whether to associate with a WFD group by using session information according to an embodiment of the present invention.

FIG. 21 is a view illustrating a method of providing session information to a user according to an embodiment of the present invention.

FIG. 22 is a view illustrating a configuration of a public action frame transmitted and received to associate with a WFD group.

FIG. 24 is a view illustrating a configuration of a user interface to receive a selection on an operation of a communication device to be performed after a device is discovered, from a user.

FIGS. 25 and 26 are views illustrating configurations of public action frames transmitted/received between a communication device and a group owner (GO) to discover a client in a WFD group.

FIGS. 27 and 28 are views illustrating configurations of public action frames transmitted/received between a communication device and a client to invite a client in a WFD group to a new WFD group.

FIGS. 29, 30, and 31 are views illustrating configurations of public action frames transmitted/received between a communication device and a client to perform a GO negotiation.

DETAILED DESCRIPTION OF THE EMBODIMENTS

Hereinafter, a device discovery method and a communication device using the same will be described in more detail with reference to FIGS. 1 to 31.

Hereinafter, detailed descriptions related to well-known functions or configurations will be ruled out in order not to unnecessarily obscure subject matters of the present invention. Moreover, terms described below are defined in consideration of the functions of the present invention and vary according to users, operators' intentions, or customs. Therefore, the definition may be determined based on the entire content of this specification.

Figure 1:
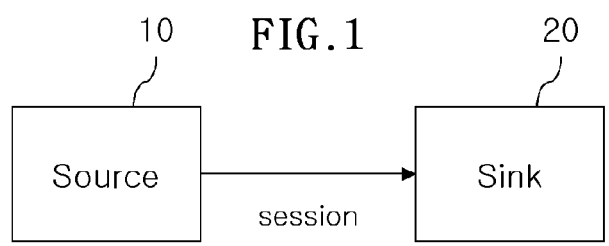
FIG. 1 is a block diagram illustrating a configuration of a display group according to an embodiment of the present invention.

FIG. 1 is a block diagram illustrating a configuration of a display group according to an embodiment of the present invention. The display group includes a source 10 and a sink 20.

Referring to FIG. 1, the source 10 and the sink 20 configure a display group to transmit and receive multimedia content such as video and audio and control signals through an interconnected session.

That is, the source 10 transmits multimedia content to the sink 20 through the interconnected session, and for this, may have a wireless LAN interface for streaming the multimedia content to the sink 20.

In addition, the sink 20 may receive and play the multimedia content transmitted from the source 10 through the interconnected session.

Here, each of the source 10 and the sink 20 may include various devices such as TVs, home theater systems, mobile phones, and tablet PCs, and each device may be divided into a source and a sink according to hardware or software functions, or may support both source and sink roles.

For example, a wireless connection between the source 10 and the sink 20 may use a 5 GHz frequency band according to IEEE 802.11ac, i.e., a WiFi standard, and in this case, the source 10 may stream an uncompressed High Definition (HD) video at a speed of up to 1 Gbps.

However, the present invention is not limited to the above wireless communication type, and may be implemented using various communication types, for example, a frequency band of 60 GHz according to the IEEE 802.11ad standard.

The source 10 and the sink 20 belonging to one display group may be connected using a P2P connection type or a Tunneled Direct Link Setup (TDLS) connection type.

For example, the source 10 and the sink 20 may configure a network, i.e., a P2P group, without an access point (AP), on the basis of the 802.11 WLAN technique, and then communicate data via a direct link. In this case, any one of the source 10 and the sink 20, as a group owner (GO), may perform a similar operation to the AP to manage the P2P group.

At the same time, each of the source 10 and the sink 20 may be connected to and communicated with an infrastructure BSS including an AP and a distribution system.

Moreover, the source 10 and the sink 20 may selectively connect to a session by using the TDLS. In this case, the source 10 and the sink 20 may connect to one AP and communicate with each other.

Figure 2:
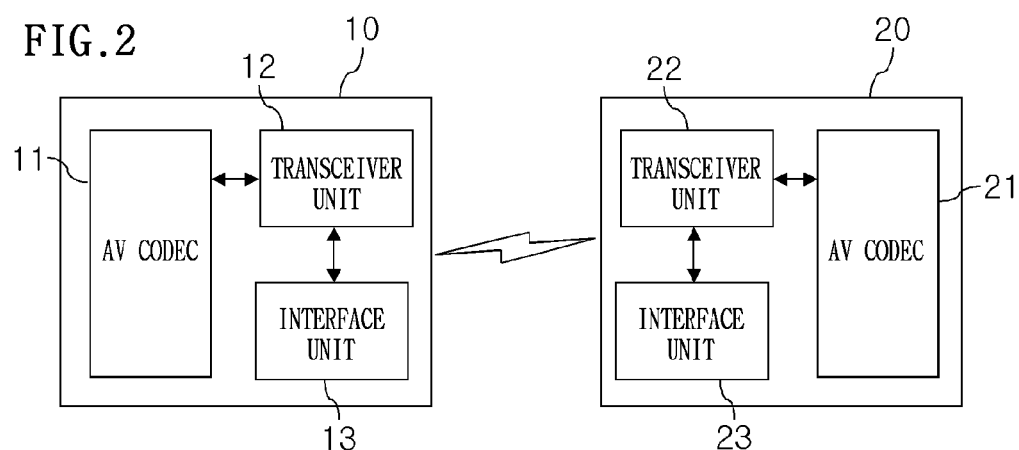
FIG. 2 is a block diagram illustrating a configuration of a source and a sink of FIG. 1 according to an embodiment of the present invention.

FIG. 2 is a block diagram illustrating a configuration of the source 10 and the sink 20 of FIG. 1 according to an embodiment of the present invention. Each of the source 10 and the sink 20 may include an AV codec 11 or 21, a transceiver unit 12 or 22, and an interface unit 13 or 23.

Referring to FIG. 2, the AV codecs 11 and 21 may encode or decode the multimedia content transmitted/received through a session between the source 10 and the sink 20.

For example, the AV codec 11 in the source 10 encodes video and audio signals to be transmitted to the sink 20, and the AV codec 21 in the sink 20 decodes the video and audio signals transmitted from the source 10.

Moreover, the transceiver units 12 and 22 may transmit/receive frames in a format set according to a communication standard to perform a session connection between the source 10 and the sink 20, including transport and network layers.

The transceiver unit 12 in the source 10 may transmit multimedia content to the sink 20 via a connected session through the above processes, and the transceiver unit 22 in the sink 20 may receive the multimedia transmitted from the source 10.

Also, the interface units 13 and 23 may perform processes such as device discovery, service discovery, and device pairing on the basis of information in the frames transmitted/received through the transceivers 12 and 22, and thus, may connect and manage a session between the source 10 and sink 20.

For this, the interface units 13 and 23 may include a MAC layer and a PHY layer for performing a device discovery method according to an embodiment of the present invention, and the MAC/PHY layers may support a communication standard such as 802.11, Wi-Fi Direct, or TDLS.

The configuration of the source 10 and the sink 20 described with reference to FIG. 2 is just one example, and the present invention is not limited thereto. Therefore, the source 10 or the sink 20 may omit some of the components shown in FIG. 2 or may further include additional components according to a function of a corresponding device.

Figure 3:
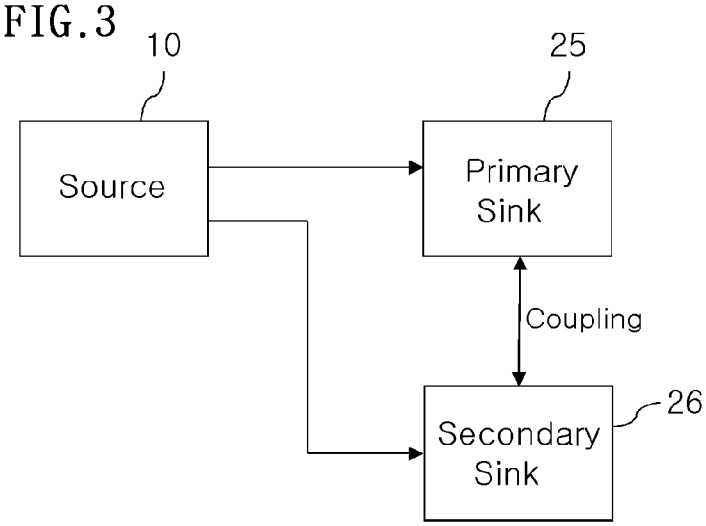
FIG. 3 is a block diagram illustrating a configuration of a display group according to another embodiment of the present invention.

FIG. 3 is a block diagram illustrating a configuration of a display group according to another embodiment of the present invention. The sink receiving multimedia content from the source 0 may be divided into a primary sink 25 and a secondary sink 26.

Referring to FIG. 3, the primary sink 25, as an AV sink device playing only audio content or video content in addition to audio and video (AV) content, may be an image display device such as a TV, a portable terminal, and a tablet PC including a display module (not shown) displaying an image and an audio output module (not shown) outputting audio.

The secondary sink 26, as an audio sink device playing only audio content, may be a device such as a speaker of a home theater system including an audio output module (not shown) outputting audio.

Moreover, the primary sink 25 and the secondary sink 26 may support a coupled sink operation.

For example, when the primary sink 25 is coupled to the secondary sink 26 through the coupled sink operation, the source 10 may re-transmit the audio content received from the primary sink 25 to the coupled secondary sink 26.

Moreover, the secondary sink 26 may directly receive audio content from the source 10 and may play it regardless of whether it is coupled to the primary sink 25 or whether the primary sink 25 exists.

Hereinafter, the case that the source 10 and the sink 20 form a P2P group using Wi-Fi Direct to transmit/receive multimedia content will be used as an example to describe an embodiment of the present invention in detail.

That is, in relation to a display group according to an embodiment of the present invention, a session between the source 10 and the sink 20 uses a P2P connection according to a Wi-Fi Direct technique, and may selectively use L2 connection according to TDLS.

Moreover, devices configuring the display group are devices basically supporting a communication type according to the 802.11n standard and also Wi-Fi direct simultaneously.

Figure 4:
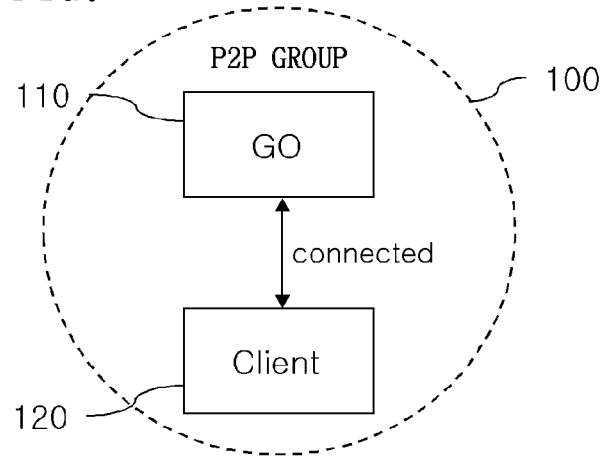
FIG. 4 is a view illustrating a configuration of a P2P group according to an embodiment of the present invention.

FIG. 4 is a view illustrating a configuration of a P2P group according to an embodiment of the present invention. The P2P group includes a group owner (GO) 110 and a client 120.

Referring to FIG. 4, the group owner GO 110 may be a device that functions similar to the AP, which provides and uses a connection between the clients 120 in the P2P group 100.

In more detail, the group owner GO 110 may provide a BBS function, services, and WLAN for the connected clients 120, and also may provide a Wi-Fi Simple Configuration (WSC) internal registrar or a communication between the clients 120.

Moreover, the client 120, as a P2P client or a legacy client connected to the group owner GO 110, performs a non-access point station (non-AP STA) function to provide a Wi-Fi Simple Configuration (WSC) enrollee function.

Figure 5:
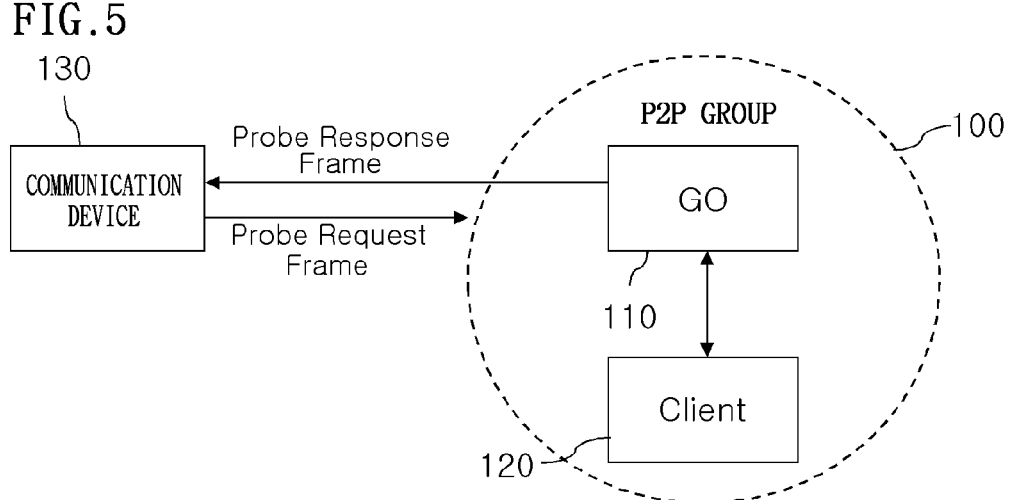
FIG. 5 is a view illustrating a configuration of a WFD group according to an embodiment of the present invention.

Referring to FIG. 5, a communication device 130, as a P2P device supporting all the functions of a group owner GO and a client described with reference to FIG. 4, may perform a P2P device discovery process (or a scan process) to associate with the P2P group 100.

The P2P device discovery process may be performed through transmission of a probe request frame and a probe response frame, i.e., a management frame defined by the 802.11 standard, and accordingly, the external communication device 130 and devices in the P2P group 100 may confirm the presence of each other.

For example, the communication device 130 broadcasts probe request frames including its own information and the group owner GO 110 and the client 120 in the P2P group 100 may receive the broadcasted probe request frames.

Moreover, among the devices receiving the probe request frames, a P2P device connected to a Wi-Fi AP, a group owner GO of a P2P group, or an AP may transmit a probe response frame to the communication device 130.

As shown in FIG. 5, the group owner GO 110 of the P2P group 100 obtains information on the communication device 130 by using the received probe request frame, and then, inserts a P2P information element (IF) containing attribute information on the P2P group 100 into a vendor specific field of the probe response frame and transmits it to the communication device 130.

Moreover, the communication device 130 may confirm the attribute information on the P2P group 100 by using the probe response frame received from the group owner GO 110, and then, may determine whether it is to be associated with the P2P group 100 on the basis of a user's selection or command.

The source 10 and the sink 20 configuring a display group according to an embodiment of the present invention may serve as the group owner GO 110 or the client 120 in the P2P group 100 described above.

For example, one of the source 10 and the sink 20, as a group owner GO of a display group, may serve similar to an AP that provides and uses a connection between clients in a corresponding display group.

Moreover, the other one of the source 10 and the sink 20, as another client, may be connected to the group owner GO of the display group and then, may communicate with other devices.

Additionally, a device to be connected to a display group including the source 10 and the sink 20 performs the P2P device discovery process described with reference to FIG. 5, to discover other neighbor devices.

Hereinafter, a device discovery method according to an embodiment of the present invention will be described with reference to FIGS. 6 to 18.

FIG. 6 is a view illustrating a device discovery method according to an embodiment of the present invention. The same method described with reference to FIGS. 1 to 5 among device discovery methods shown will be omitted.

Referring to FIG. 6, a display group 200 (hereinafter, referred to as a Wi-Fi display (WFD) group) includes an interconnected source 210 and sink 220. The source 210 and the sink 220 in the WFD group 200 may configure a session to transmit/receive multimedia content by using a P2P connection type or a TDLS connection type.

A communication device 230 transmitting/receiving multimedia content in connection with an external device or the WFD group broadcasts and transmits a probe request frame to discover other devices in the surrounding in operation 5300.

FIG. 7 is a view illustrating a format of a management frame according to the 802.11 standard. The probe request frame may be configured according to the management frame 400 of FIG. 7.

Referring to FIG. 7, the probe request frame may include a MAC Header 410, frame bodies 420 and 430, and an FCS 440.

The MAC Header 410 may include a Frame Control field, a Duration/ID field, an Address field, a Sequence Control field, and a QoS control field.

Moreover, the frame control field includes control information used for defining a type of the 802.11 MAC frame, and the duration/ID field includes a remaining duration for receiving the next frame or Association Identity (AID) information of a transfer station (STA).

Additionally, the address field may include information on a Destination Address, a Source Address, a Receiver Address, and a Transmitter Address according to a frame type.

Also, the sequence control field may include a Fragment Number field and a Sequence Number field, and also may include information on the fragment number and sequence number of each frame. The QoS control field may include information on Quality of Service relating to frame transmission.

The frame body field may include a frame dada 420 and a Vender Specific field 430. A P2P IE, i.e., an element including attribute information on a P2P group, and a WFD IE, i.e., an element including type and state information on devices in the WFD group 200 may be sequentially inserted into the Vender Specified field 430.

Moreover, the FCS field 440 may include Cyclic Redundancy Check (CRC) information relating to error correction of a frame.

Referring to FIG. 8, the frame data 420 of the frame body field may include basic service set identification (SSID) field, a Supported rates field, a Request information field, and an Extended Supported Rates field.

The SSID field indicates the identifier of BSS or IBSS, and the support rates field indicates a supporatable data rate. Information on the supportable data rate may be selectively included in the Extended Supported Rates field if necessary.

Additionally, the request information field may be used when a device responding to a probe request frame requests information to be included in a probe response frame.

Referring to FIG. 9, a P2P IE 431 inserted into the Vender Specific field 430 in the frame body field may include attribute information such as a P2P Capability, a P2P Device ID, a Listen Channel, an Extended Listen Timing, and an Operating Channel.

The P2P Capability includes a set of parameters used for setting a P2P connection, and the P2P Device ID includes the P2P Device Address of a P2P device.

Moreover, the Listen Channel indicates an Operation Class and a channel number on which the P2P device is in a Listen status, and the Operating Class indicates a frequency band on which the P2P device is in a Listen status.

Moreover, the Listen Channel indicates an Operation Class and a channel number on which the P2P device is in a Listen status, and the Operating Class indicates a frequency band on which the P2P device is in a Listen status.

Additionally, the Extended Listen Timing may be used to deliver a Listen State availability timing for a P2P device transmitting the probe request frame.

FIG. 10 is a table illustrating a configuration of the WFD IE 432 inserted into the Vendor Specific field 430 according to an embodiment of the present invention.

Referring to FIG. 10 (a), the WFD IE 432 may include an Element ID field, a Length) field, an OUI field, an OUI Type field, and a WFD Attributes field.

The Element ID field indicates an element type, and the Element ID field value of the WFD IE may be 'OxDD'.

The Length field indicates the length of the following fields in the WFD IE, and accordingly, may have a value set to 4 plus the length of the WFD Attributes field.

Additionally, the OUI field, as an Organizationally Unique Identifier designated by the Wi-Fi alliance with respect to the WFD IE, may have a value of '50 6F 9A'.

The OUi type field indicates a type or version of the WFD IE. Setting to '0x0A' indicates 'WFA WFD v1.0'.

The WFD Attributes field may include type and status information on devices in the WFD group, and in more detail, may include various attribute information as shown in FIG. 10 (b).

Moreover, the attribute information shown in FIG. 10 (b) is configured with sub elements in the WFD IE element to be represented hierarchically.

FIG. 10 (c) is a table illustrating a configuration of an WFD IE in a probe request frame according to an embodiment of the present invention, and shows sub elements of the WFD IE including the attribute information.

Referring to FIG. 10 (c), the WFD IE may include WFD Device Information, Associated BSSID, and Coupled Sink Information, as sub elements.

The WFD Device Information sub element is used to deliver signal information that each WFD device requires during a discovery process for determining whether to generate a session through an attempt of pairing. A configuration of the signal information in the WFD device information will be described in more detail with reference to FIG. 16.

The Associated BSSID sub element indicates the address of a connected AP when a corresponding WFD device is connected to an infrastructure AP.

The Coupled Sink Information sub element may indicate a coupling status of a WFD device when a corresponding WFD device supports a coupled sink operation.

In operation 5300, the communication device 230 may configure the P2P IE 431 and WFD IE 432 described with reference to FIGS. 7 to 10 according to its status, may insert them into the Vendor Specific field 430 of the probe request frame 400, and then, may transmit the probe request frame 400.

Moreover, surrounding devices (for example, the source 210 and the sink 220 in the WFD group 200) may confirm whether the communication device 230 is a general Wi-Fi device, whether the communication device 230 supports Wi-Fi Direct, or whether the communication device 2320 supports Wi-Fi display, i.e., a multimedia content transmitting technique according to an embodiment of the present invention.

Then, the group owner GO in the WFD group 200 transmits a probe response frame including session information in response to the received probe request frame in operation 5310.

As shown in FIG. 6, the source 210 in the WFD group 200 may serve as the group owner GO, and accordingly, the source 210 may transmit the probe response frame to the communication device 230.

Moreover, the sink 220 may serve as the group owner GO in the WFD group 200, and in this case, the probe response frame may be transmitted from the sink 220 to the external communication device 230.

According to an embodiment of the present invention, the session information in the probe response frame may include information on all clients connected to the group owner GO in the WFD group.

For example, the session information may include information on the sink 220 connected to the source 210, i.e., the group owner GO in the WFD group 200.

Moreover, the probe response frame may be configured using the format of a management frame according to the 802.11 standard described with reference to FIG. 7, and the session information may be included in the WFD IE 432 inserted into the Vendor Specific field 430 in the frame body of the probe response frame.

Hereinafter, a configuration of a probe response frame according to an embodiment of the present invention will be described with reference to FIGS. 11 to 18. Moreover, the same configuration of the probe request frame described with reference to FIGS. 7 to 10 among configuration of the probe response frame will not be described again.

Referring to FIG. 11, the frame data 420 in the frame body of the probe response frame may include 22 fields such as a Timestamp field, a Beacon interval field, a Capability field, an SSID field, a Supported rates field, an FH Parameter Set field, and an EDCA PArameter Set field.

Each field in the frame data 420 is defined by the 802.11 standard, and thus, its detailed description will be omitted.

Referring to FIG. 12, the P2P IE 431 inserted into the Vender Specific field 430 in the frame body field may include attribute information such as a P2P Capability, Extended Listen Timing, Notice of Absence, P2P Device Info, and P2P Group Info.

The Notice of Absence may be used to notify the absence of the P2P group owner GO due to power save timing, a concurrent operation, or off-channel scanning.

Additionally, the P2P Device Info may include information on a P2P device, and the P2P Group Info may include device information on P2P clients, i.e., members of the P2P group.

Referring to FIG. 13, the WFD IE 432 inserted into the Vender Specific field 430 in the frame body field of the probe response frame may include WFD Device Information, Associated BSSID, Coupled Sink Information, and WFD Session Information, as sub elements.

Moreover, the sub elements shown in FIG. 13 may include the WFD attribute information shown in FIG. 10 (b), and for example, the WFD Session Information may include at least part of the attribute information shown in FIG. 10 (b) to have information on clients belonging to the WFD group.

The WFD Device Information, Associated BSSID, and Coupled Sink Information sub elements included in the WFD IE 432 include information on the WFD group owner GO transmitting the probe response frame.

Moreover, the WFD Session Information sub element may include information on all clients connected to the WFD group owner GO.

For example, the WFD group owner GO may cache information delivered from a client during session connection, and then, may configure the WFD session information to include information on all clients connected to the WFD group owner GO.

Referring to FIG. 14, the WFD Session Information sub element may include a Subelement ID field, a Length field, and a WFD Device Info Descriptor field.

The Subelement ID field indicates a type of sub elements included in the WFD IE 432, and a Subelement ID field value of the WFD Session Information sub element may be '9'.

The Length field indicates the length of the following fields of a corresponding sub element among the WFD Session Information sub elements.

Moreover, the WFD Device Info Descriptor field may include information on each of clients connected to the WFD group owner GO as in a list format.

Referring to FIG. 15, the WFD Device Info Descriptor may include a Length field, a Device address field, a WFD Device Information field, an Associated BSSID field, and a Coupled Sink Information field.

The Device address field indicates a device address for each WFD client, and the WFD Device Information field may include a device information bitmap indicating a status and capability of a corresponding client.

Moreover, the Associated BSSID sub element may include the address of a connected AP as connection server set identification information when a corresponding client is connected to an infrastructure AP.

Additionally, the Coupled Sink Information sub element may indicate a coupling status of a client when a corresponding client supports a coupled sink operation.

Referring to FIG. 16, the WFD Device Information bitmap in the WFD Device Information field is configured with total 15 bits. The zeroth and first bits indicate a device type of a corresponding client. The second bit indicates whether a corresponding client supports a secondary sink operation.

Additionally, the third and fourth bits indicate a current status of a corresponding client. The fifth bit indicates whether a corresponding client supports a service discovery function.

Moreover, the sixth bit indicates which connection type among a P2P connection type and a TDLS connection type a corresponding client prefers, and the seventh bit indicates whether a corresponding client supports a content protection function.

Referring to FIG. 17, the Coupled Sink Information sub element may include a Coupled Sink Status field indicating a coupling status on a client supporting a coupled sink operation and a Coupled Sink Address field indicating the address of a coupled device.

Referring to FIG. 18, the Coupled Sink Status field included in the Coupled Sink Information sub element, as a bit map indicating a current coupling status on a client supporting the coupled sink operation, may indicate a coupling status of a corresponding device by using the first and second bits.

In operation 5310, the WFD group owner GO, for example, the source 210, may configure the P2P IE 431 and WFD IE 432 described with reference to FIGS. 11 to 18 according to the statues of the group owner GO in the WFD group and all clients connected thereto, may insert them into the Vendor Specific field 430 of the probe response frame, and then, may transmit the probe response frame to the communication device 230.

Moreover, the communication device transmitting a probe request frame may obtain information on all clients connected to a group GO in the WFD group 200 by using WFD session information in a probe response frame received from the WFD group owner GO.

As mentioned above, according to an embodiment of the present invention, a device, i.e., a group owner GO in the WFD group 200 receiving a probe request frame, includes its own information and also session information on clients connected to the device in a probe response frame, and then delivers it to the external communication device 230 transmitting a request frame.

Moreover, the communication device 230 receiving the probe response frame outside the WFD group 200 may confirm what clients exist in the WFD group 200 by using the session information in the probe response frame received from the group owner GO, and accordingly, may determine whether to associate with the WFD group 200.

Hereinafter, a method of the external communication device 230 to associate with the WFD group by using information received from the probe response frame will be described with reference to FIGS. 19 to 22 according to an embodiment of the present invention.

FIG. 19 is a view illustrating a method of associating with a WFD group according to an embodiment of the present invention. The same method described with reference to FIGS. 1 to 18 among association methods shown will be omitted.

Referring to FIG. 19, the communication device 230 broadcasts and transmits a probe request frame in operation 5300, and the source 210, i.e., the owner 210 of the WFD group 200 receiving the probe request frame, transmits a probe response frame to the communication device 230 in operation 5310.

As mentioned above, the P2P IE 'T WFD IE elements relating to the communication device 230 may be inserted into the vendor specific field of the probe request frame, and thus, may be delivered to the source 210 and the client 220 of the WFD group 200 receiving the probe request frame.

In addition, the group owner GO, for example, the source 210, among the source 210 and the client 220 of the WFD group 200 receiving the probe request frame may insert the P2P IE and WFD IE elements into the vender specific field of the probe response frame, and then transmits it to the communication device 230.

Especially, pre-collected session information on all clients (for example, the sink 220) connected to the source 210, i.e., the group owner GO, may be included in the WFD IE of the probe response frame.

Then, the communication device 230 provides the session information in the probe response frame to a user in operation 5320, and receives a user selection according to the provided session information in operation 5330.

For example, the communication device 230 may notify a user of WFD session information in the probe response frame through a user interface such as a display module (not shown) or a sound output module (not shown), and accordingly, the user may obtain information on all clients belonging to the WFD group 200.

The WFD Session Information provided to the user may include information described with reference to FIGS. 13 to 18 for each device operating as a client in the WFD group 200, for example, a device address, a device type, whether to support a secondary sink operation, a current status, whether to support a service discovery function, a preferred connection method, whether to support a content protection function, Associated BSSID, and Coupled Sink Information.

After confirming the session information, a user may select whether it is associated with the WFD group 200, or whether it performs another operation, on the basis of information on all clients belonging to the WFD group 200.

FIG. 20 is a view illustrating a method of determining whether to associate with the WFD group 200 according to the WFD session information in a probe response frame when the communication device 231 transmitting a probe request frame is a secondary sink device.

Referring to FIG. 20 (*a*), when both the source 210 and the primary sink 221 in the WFD group 200 support a coupled sink operation and there is no secondary sink device in the WFD group 200, a user may select the communication device 231, i.e., a secondary sink device, to be connected to the WFD group 200.

In this case, as shown in FIG. 21 (*a*), a type, a category, and whether to support a coupled sink operation for each of devices in the WFD group 200 may be displayed on the screen of the communication device 230, and at least a portion of the displayed information may be obtained by using the WFD session information in the probe response frame.

After confirming the information displayed on the screen of the communication device 230, a user may select whether to connect the communication device 231 to the WFD group 200.

For example, as shown in FIG. 21 (*a*), a user selects a 'Connect' button to provide a command for connecting the communication device 231, i.e. a secondary sink device, to the WFD group 200.

Referring to FIG. 20 (*b*), if the secondary sink 222 already exists in the WFD group 200, a user may determine not to connect the communication device 231, i.e., a secondary sink device, to the WFD group 200.

In this case, as shown in FIG. 21 (*b*), information on a source device, a primary sink device, and a secondary sink device in the WFD group 200 may be displayed on the screen of the communication device 230, and a user may select a 'Cancel' button to cancel the connection with the WFD group 200.

Moreover, the case that a user of the communication device 230 determines whether to associate with the WFD group 200 on the basis of WFD session information in a probe response frame is described according to an embodiment of the present invention, but the present invention is not limited thereto. For example, the communication device 230 may determine whether to associate with the WFD group 200 according to a preset algorithm on the basis of the session information.

Then, the communication device 230 connects to the WFD group 200 according to the user's selection in operation 5340.

The communication device 230 may connect to the WFD group 200 by using one of a P2P connection method and a TDLS connection method according to Wi-Fi Direct.

For example, in the case of the P2P connection method, the communication device 230 may transmit a provision discovery request first in order to join the WFD group 200.

The provision discovery request may be transmitted as an action frame according to a format of a public action frame defined by the 802.11k standard, and the communication device 230 may transmit the provision discovery request frame to the source 210, i.e., the group owner GO, through an operating channel of the WFD group 200.

The provision discovery request frame, as described with reference to FIG. 9, may include a P2P IE, and the P2P IE of the provision discovery request frame may include attribute information such as a P2P Capability, a P2P Device ID, and a P2P Device ID as shown in FIG. 22.

Referring to FIG. 22, the P2P Capability includes a set of parameters used to set the P2P connection, and the P2P Device ID includes the P2P Device Address of a P2P device transmitting the provision discovery request frame.

The P2P Group ID identifies a P2P group to which the P2P device is to connect, and in more detail, may include a device address of a group owner GO belonging to the P2P group.

Additionally, the provision discovery request frame further includes the WFD IE described with reference to FIG. 10. The WFD IE may include a WFD Device Information sub element, an Associated BSSID sub element, and a Local IP Address sub element.

The source 210, i.e., the WFD group owner GO, transmits a provision discovery response frame, to the communication device 230, in response to the provision discovery request.

The provision discovery response frame may include a Config Methods attribute indicating a result of the provision discovery request, i.e., success or failure, by using the public action frame format.

After the provision discovery is completed, the communication device 230 may perform an authentication procedure and an association procedure according the 802.11 standard with the source 210, i.e., the WFD group owner GO, and then may connect to the WFD group 200.

Moreover, although the case that the source 210 serves as the group owner GO in the WFD group 200 is described according to an embodiment of the present invention, the sink 220 may serve as the group owner GO.

According to another embodiment of the present invention, the external WFD device 230 may configure a new WFD group with a client in the WFD group 200 by using WFD session information in a probe response frame.

Figure 23:
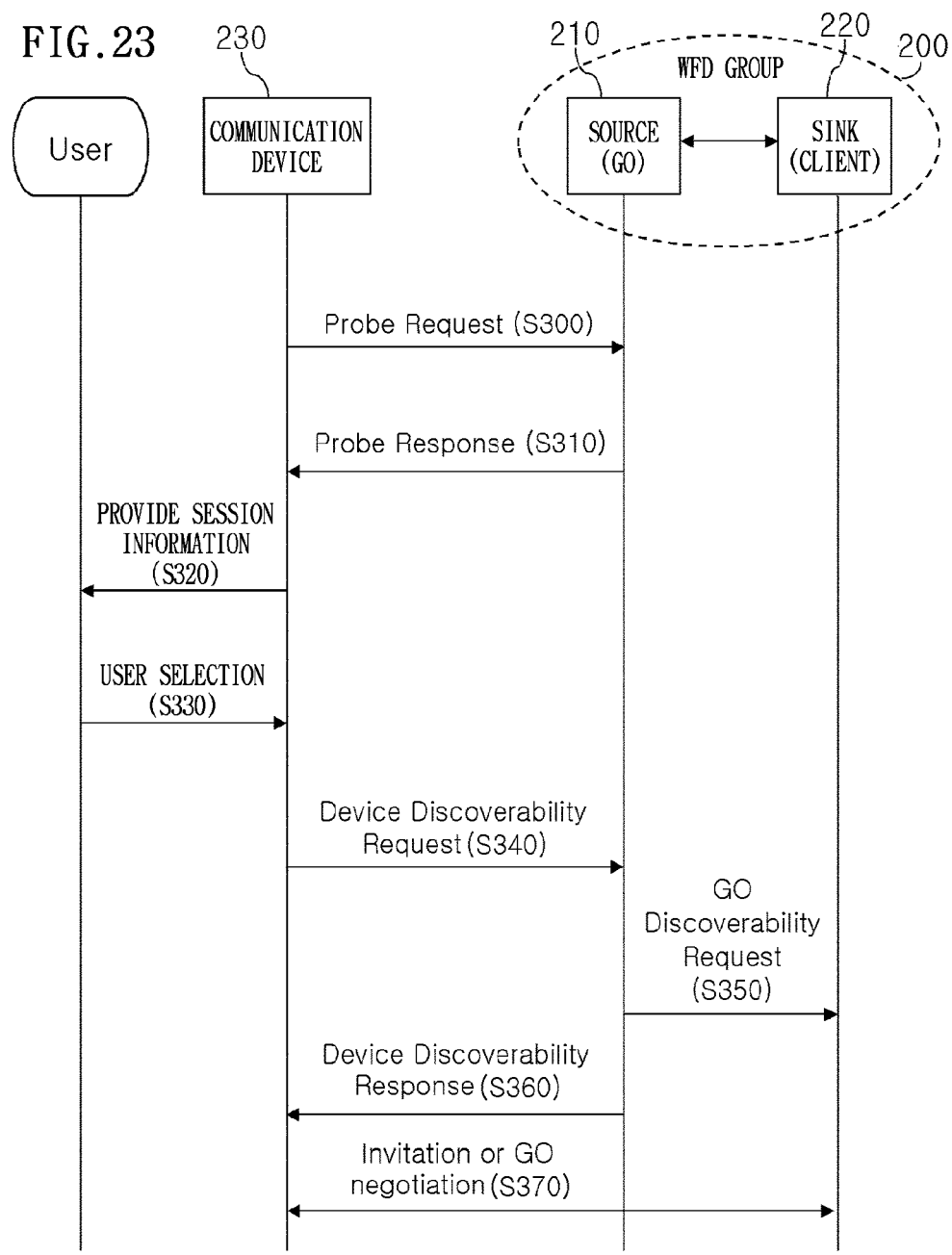
FIG. 23 is a view illustrating a method of configuring a WFD group according to an embodiment of the present invention.

FIG. 23 is a view illustrating a method of configuring a new WFD group according to an embodiment of the present invention. The same method described with reference to FIGS. 1 to 22 among association methods shown will be omitted.

Referring to FIG. 23, the communication device 230 broadcasts and transmits a probe request frame in operation 5300, and the source 210, i.e., the owner 210 of the WFD group 200 receiving the probe request frame, transmits a probe response frame to the communication device 230 in operation 5310.

Then, the communication device 230 provides the session information in the probe response frame to a user in operation 5320, and receives a user selection according to the provided session information in operation 5330.

In operation 5330, a user obtains information on all clients in the WFD group 200 by using the WFD session information in the probe response frame, and then, may determine to configure at least one among the WFD group 200 and another WFD group besides the WFD group 200.

In this case, as shown in FIG. 24 (*b*), information on a source device, a primary sink device, and a secondary sink device in the WFD group 200 may be displayed on the screen of the communication device 230, and a user may select a 'Cancel' button to cancel the connection with the WFD group 230.

Also, as shown in FIG. 24 (*b*), a user selects one of clients belonging to the WFD group 200, and then, selects an 'invitation' button to invite the selected client to another WFD group that the communication device 230 belongs, or select a 'Negotiation' button to negotiate with the selected client on which device become a group owner GO of a new WFD group.

When a user selects a new configuration of a WFD group, the communication device 230 transmits a Device Discoverability Request frame to the source 210, i.e., the group owner GO of the WFD group 200 in operation 5340.

The Device Discoverability Request is for determining whether a client (for example, the sink 220) is in a status to support a current device discovery.

The communication device 230 may confirm that the sink 220 is in a status for current discovery through a Device Discoverability Response received from the source 210 in response to the Device Discoverability Request, and then, may perform a service discovery with the sink 220 or configure a new WFD group.

Moreover, the Device Discoverability Request may uses a format of a Public Action Frame defined by the 802.11k standard, and as shown in FIG. 25, may include identification information on the WFD group 200 and identification information on a device in the WFD group 200.

For example, the identification information on the WFD group 200 includes the address of the source 210, i.e., the group owner GO, and the device identification information may include the address of the client with which the communication device 230 configures a new WFD group.

The source 210 receiving the Device Discoverability Request frame transmits a GO Discoverability Request frame to the sink 220, i.e., a corresponding client in operation 5350.

The GO Discoverability Request may use a format of an action frame defined by the 802.11 standard, and may not include an additional element field.

When the GO Discoverability Request frame is successfully delivered, the source 210, i.e., the group owner GO, transmits a Device Discoverability Response frame to the communication device 230 in operation 5360.

The Device Discoverability Response may use a format of a public action frame defined by the 802.11k standard, and may indicate a result of the Discoverability request, i.e., success or failure, by using a status code shown in FIG. 26.

When a discovery for a client in the WFD group 200 is completed, the communication device 230 transmits and receives a frame for a corresponding client (for example, invitation or Go negotiation with the sink 20) to configure a new WFD group in operation 5370.

For example, the communication device 230 transmits an invitation request frame to the sink 220, i.e. a client of the WFD group 200, and the sink 220 transmits an invitation response frame to the communication device 230 in response to the invitation request frame. Therefore, the sink 220 may be included as a client in the WFD group that the communication device 230 belongs.

The invitation request and the invitation response may use a format of a public action frame defined by the 802.11k standard, and the invitation request frame may include attributes such as an P2P Group ID), a P2P Group BSSID, a Channel List, an Operating Channel, and a Configuration Timeout as shown in FIG. 27.

Referring to FIG. 28, the invitation response frame may include attributes such as Configuration Timeout, an Operating Channel, a P2P Group BSSID, and a Channel List in addition to a status attribute indicating whether to accept the invitation request.

Additionally, the communication device 230 may transmit a GO Negotiation Request frame to the sink 220 in order to form a new WFD group with the sink 220, i.e., a client of the WFD group 200.

The GO negotiation request frame may use a format of a public action frame defined by the 802.11k standard and as shown in FIG. 29, may include attributes such as a P2P Capability, a Group Owner Intent, a Configuration Timeout, a Listen Channel, an Extended Listen Timing, an Intended P2P Interface Address, a Channel List, P2P Device Info and an Operating Channel.

Here, when the communication device 230 transmitting the GO negotiation request becomes the group owner of a new WFD group, the Group Owner Intent field of the GO negotiation request frame is set to a predetermined value, for example, '15'.

The sink 220 receiving the GO negotiation request transmits a GO Negotiation Response frame to the communication device 230 in response thereto.

The GO negotiation response frame may use a format of a public action frame defined by the 802.11k standard and as shown in FIG. 30, may include attributes such as a Status, a P2P Capability, a Group Owner Intent, a Configuration Timeout, an Operating Channel, an Intended P2P Interface Address, a Channel List, P2P Device Info, and a P2P Group ID.

The Status attribute may indicate whether a device receiving the GO negotiation request participates in a new group formation, as a status code.

Moreover, when a device receiving the GO negotiation request becomes a group owner GO, the Group Owner Intent field of the GO negotiation response frame is set to a predetermined value, for example, '15'.

Then, the communication device 230 determines the group owner GO of a new WFD group according to the information received through the GO negotiation response frame, and transmits a GO Negotiation Confirmation frame to the sink 220 according to the determined item.

The GO negotiation Confirmation frame may use a format of a public action frame defined by the 802.11k standard and as shown in FIG. 31, may include attributes such as a Status, a P2P Capability, an Operating Channel, a Channel List, and a P2P Group ID.

The Status attribute indicates whether the GO negotiation request is successful and the P2P Group ID attribute includes the SSID of a WFD group.

Moreover, although the case that the source 210 serves as the group owner GO in the WFD group 200 is described according to an embodiment of the present invention, the sink 220 may serve as the group owner GO.

According to another embodiment of the present invention, the communication device 230 outside the WFD group 200 may directly transmit/receive public action frames to/from a corresponding client without an association process with a client in the WFD group 200 by using the WFD session information received from the group owner GO of the WFD group 200.

In addition, the external communication device 230 may perform Invitation, GO Negotiation, or Service Discovery with a client in the WFD group 200 through the transmission of the public action frames. Accordingly, a corresponding client may invite the communication device 230 to its WFD group, connect to a previous WFD session on the basis of Persistent WFD group information, or generate a new WFD group to associate with a WFD session.

According to an embodiment of the present invention, by including session information on a client in a probe response frame received from a group owner (GO) among source and sink devices belonging to a display group, a communication device to be connected to the display group may easily obtain information client devices in addition to information on a GO belonging to a corresponding display group.

According to another embodiment of the present invention, a communication device or a user thereof may determine whether it is connected to a corresponding group after a current state of a display group is checked on the basis of the obtained session information.

According to another embodiment of the present invention, a communication device may configure a new group with a client belonging to a display group by using the obtained session information.

Part of a device discovery method according to the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices, and carrier waves (such as data transmission through the Internet).

The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed:

1. A method of discovering information on a communication device, the method comprising:
    transmitting, by a first communication device, a probe request frame to a second communication device;
    receiving, by the first communication device, a probe response frame including information on one or more clients of the second communication device, from the second communication device, the clients being WFD (Wi-Fi Display) devices associated with the second communication device,
    wherein the information comprises WFD device information field having a format of a single bitmap indicating:
        a WFD device type indicating source or sink;
        whether a sink operation is supported or not;
        whether a WFD service discovery (WSD) is supported or not,
        a preferred connectivity (PC), and
        whether a contents protection is supported.

2. The method of claim 1, wherein the WFD device type indicates one of a WFD source, a WFD primary sink, a WFD secondary sink, and a WFD source/primary sink,
    wherein the WFD source/primary sink represents a device having capability to act as both the source and the sink.

3. The method of claim 1, wherein the PC indicates one of a P2P and a TDLS (Tunneled Direct Link Setup).

4. The method of claim 1, wherein the second communication device, from which the probe response frame is received, is acting as a group owner.

5. The method of claim 1, wherein the information further comprises subelement ID field identifying a type of WFD subelement.

6. A communication device discovering information on other communication devices, the device comprising:
    a transceiver configured to transmit a probe request frame to a second communication device, and to receive a probe response frame including information on one or more clients of the second communication device from the second communication device, the clients being WFD (Wi-Fi Display) devices associated with the second communication device; and
    a processor connected to the transceiver and configured to process the information,
    wherein the information comprises WFD device information field having a format of a single bitmap indicating:
        a WFD device type indicating source or sink;
        whether a sink operation is supported or not;
        whether a WFD service discovery (WSD) is supported or not,
        a preferred connectivity (PC), and
        whether a contents protection is supported.

7. The device of claim 6, wherein the WFD device type indicates one of a WFD source, a WFD primary sink, a WFD secondary sink, and a WFD source/primary sink,
    wherein the WFD source/primary sink represents a device having capability to act as both the source and the sink.

8. The device of claim 6, wherein the PC indicates one of a P2P and a TDLS (Tunneled Direct Link Setup).

9. The device of claim 6, wherein the second communication device, from which the probe response frame is received, is acting as a group owner.

10. The device of claim 6, wherein the information further comprises subelement ID field identifying a type of WFD subelement.

\* \* \* \* \*